United States Patent
Li et al.

(10) Patent No.: US 9,613,216 B2
(45) Date of Patent: Apr. 4, 2017

(54) ENCRYPTION RECOMMENDATION METHOD AND ENCRYPTION RECOMMENDATION DEVICE

(71) Applicant: Tencent Technology (Shenzhen) Company Limited, Shenzhen (CN)

(72) Inventors: Danhua Li, Shenzhen (CN); Rulan Lin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/495,557

(22) Filed: Sep. 24, 2014

(65) Prior Publication Data
US 2015/0013013 A1 Jan. 8, 2015

Related U.S. Application Data

(63) Continuation of application No. PCT/CN2013/091056, filed on Dec. 31, 2013.

(30) Foreign Application Priority Data

Jun. 5, 2013 (CN) .............................. 2013 0220236

(51) Int. Cl.
*G06F 21/62* (2013.01)
*G06F 21/60* (2013.01)

(52) U.S. Cl.
CPC .......... *G06F 21/60* (2013.01); *G06F 21/6245* (2013.01)

(58) Field of Classification Search
CPC ...... G06F 21/60; G06F 21/602; G06F 21/604; G06F 21/62; G06F 21/6209; G06F 21/6218; G06F 21/6245; G06F 21/629; G06F 2221/2107
See application file for complete search history.

(56) References Cited

U.S. PATENT DOCUMENTS

| | | | |
|---|---|---|---|
| 8,903,458 B1* | 12/2014 | Ho | H04W 52/0261 455/423 |
| 2013/0031595 A1* | 1/2013 | Nevstruev | G06F 21/6245 726/1 |

FOREIGN PATENT DOCUMENTS

| | | |
|---|---|---|
| CN | 101651861 A | 2/2010 |
| CN | 102118512 A | 7/2011 |
| CN | 102196431 A | 9/2011 |
| CN | 102799827 A | 11/2012 |
| CN | 103024168 A | 4/2013 |
| EP | 2 544 117 A1 | 1/2013 |

OTHER PUBLICATIONS

Copy of ISR and Written Opinion to PCT International Application No. PCT/CN2013/091056 dated Mar. 20, 2014, (9p).
Office Action dated Nov. 25, 2015 for corresponding Chinese Patent Application No. 201310220236.1, 6 pages.

* cited by examiner

*Primary Examiner* — Minh Dinh
(74) *Attorney, Agent, or Firm* — Brinks Gilson & Lione

(57) ABSTRACT

An encryption recommendation method and an encryption recommendation device are provided. The method includes: scanning user operations on an application in a terminal, and obtaining a frequency of usage of each application; obtaining a set of frequently-used applications from the applications based on the frequency of usage of the each application; and determining, based on privacy weights of the set of frequently-used applications, at least one recommended application to be encrypted from the set of frequently-used applications.

8 Claims, 5 Drawing Sheets

ENCRYPTION RECOMMENDATION METHOD AND ENCRYPTION RECOMMENDATION DEVICE

CROSS-REFERENCES TO RELATED APPLICATIONS

The present application is a continuation of PCT/CN2013/091056, filed on Dec. 31, 2013 and entitled "ENCRYPTION RECOMMENDATION METHOD, ENCRYPTION RECOMMENDATION DEVICE, TERMINAL AND STORAGE MEDIUM", which claims priority to Chinese Patent Application No. 201310220236.1, entitled as "ENCRYPTION RECOMMENDATION METHOD, ENCRYPTION RECOMMENDATION DEVICE AND TERMINAL", filed on Jun. 5, 2013 with State Intellectual Property Office of People's Republic of China, both of which are incorporated herein by reference in their entireties.

TECHNICAL FIELD

The present disclosure relates to internet technologies, and in particular, to an encryption recommendation method, an encryption recommendation device, a terminal and a storage medium.

BACKGROUND

When using cell phones and computers, users may encrypt private files (e.g., photos, videos, messages, etc.) or private applications (e.g., Social Network Software, etc.) to prevent the private files or private applications from being used by others. Consequently, privacy leaks are effectively avoided. In practice, the users need to manually select the private files or private applications to perform encryption, and obviously, the efficiency of selection may decrease along with the increase of the quantity of the private files or private applications.

SUMMARY

An encryption recommendation method, an encryption recommendation device, a terminal and a storage medium are provided according to the embodiments of the disclosure. With the technical solution of the present disclosure, the encryptable private application may be rapidly and effectively recommended to the user.

In a first aspect, an encryption recommendation method is provided. The method includes: scanning user operations on applications in a terminal, and obtaining a frequency of usage of each application; obtaining a set of frequently-used applications from the applications based on the frequency of usage of the each application; and determining at least one recommended application to be encrypted from the set of frequently-used applications, based on privacy weights of the set of frequently-used applications.

In a second aspect, it is provided another method for recommending encryption, including: scanning a user operation on an application in a terminal; determining whether a privacy weight of the application is greater than or equal to a preset privacy weight threshold; detecting whether a corresponding file is generated in a catalog of the application caused by the operation on the application if the privacy weight of the application is greater than or equal to the preset privacy weight threshold; and recommending the corresponding file as a private file to be encrypted if the corresponding file is generated in the catalog of the application caused by the operation on the application.

In a third aspect, an encryption recommendation device is provided that includes a hardware processor and a non-transitory storage medium. The non-transitory storage medium is configured to store units including: a scan unit, an obtaining unit, and a recommendation unit. The scan unit is programmed to scan user operations on applications in a terminal, and obtain a frequency of usage of each application. The obtaining unit is programmed to obtain a set of frequently-used applications from the applications based on the frequency of usage of the each application in the terminal The recommendation unit is programmed to determine at least one recommended application from the set of frequently-used applications, based on privacy weights of the set of frequently-used applications; wherein the at least one recommended application is to be encrypted.

In a fourth aspect, another encryption recommendation device is provided that includes a hardware processor and a non-transitory storage medium. The non-transitory storage medium is configured to store units including: a scan unit, a determination unit, a detection unit, and recommendation unit. The scan unit is programmed to scan a user operation on an application in a terminal The determination unit is programmed to determine whether a privacy weight of the application is greater than or equal to a preset privacy weight threshold. The detection unit is programmed to detect whether a corresponding file is generated in a catalog of the application caused by the operation on the application, if it is determined by the determination unit that the privacy weight of the application is greater than or equal to the preset privacy weight threshold. The recommendation unit is programmed to recommend the corresponding file as a private file to be encrypted, if it is detected by the detection unit that the corresponding file is generated in the catalog of the application caused by the operations on the application.

According to the fifth aspect of the embodiments of the disclosure, it is provided a terminal including the encryption recommendation device provided in the third aspect of the embodiments of the disclosure.

According to the sixth aspect of the embodiments of the disclosure, it is provided a terminal including the encryption recommendation device provided in the fourth aspect of the embodiments of the disclosure.

According to the seventh aspect of the embodiments of the disclosure, it is provided a non-transitory storage medium, in which executable instructions are stored, and the instructions are programmed to implement the encryption recommendation method provided in the first aspect of the embodiments of the disclosure.

According to the eighth aspect of the embodiments of the disclosure, it is provided a non-transitory storage medium, in which executable instructions are stored, and the instructions are programmed to implement the encryption recommendation method provided in the second aspect of the embodiments of the disclosure.

With the embodiments of the disclosure, the encryptable private application may be automatically recommended to the user when the user operates the application in the terminal; therefore, the encryptable private application may be rapidly and effectively recommended to the user.

BRIEF DESCRIPTION OF THE DRAWINGS

For explaining a technical solution according to embodiments of the disclosure more clearly, drawings to be used according to the embodiments of the disclosure are described briefly; apparently, the drawings in the following description are merely some of the embodiments of the disclosure, other drawings may be obtained based on the drawings by those skilled in the art without inventive efforts.

DETAILED DESCRIPTION OF THE EMBODIMENTS

A technical solution of embodiments of the disclosure is clearly and completely described hereinafter in conjunction with drawings according to the embodiments of the disclosure; obviously, the described embodiments are merely part of the embodiments, rather than all the embodiments. Any other embodiment obtained based on the embodiments of the disclosure by those skilled in the art without inventive efforts should fall in the scope of protection of the disclosure.

An encryption recommendation method and an encryption recommendation device, a terminal, and a storage medium are provided according to the embodiments of the disclosure. With the technical solution according to the disclosure, encryptable private files or encryptable private applications may be rapidly and effectively recommended to a user. The method, device and terminal are explained hereinafter in detail.

Figure 1:
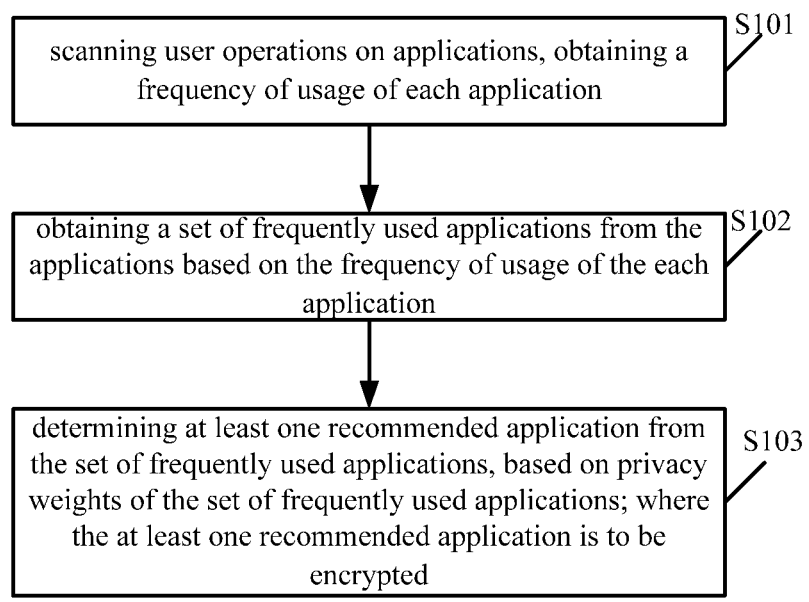
FIG. 1 is an example flow chart of an encryption recommendation method according to embodiments of the disclosure.

FIG. 1 illustrates a flow chart of an encryption recommendation method according to embodiments of the disclosure. Here the method may be applied in terminals such as Smart Phones (e.g., Android phones, iOS phones, etc.), Tablet Personal Computers, Personal Digital Assistants, Mobile Internet Devices, Personal Computers, etc., which is not limited according to the embodiment of the disclosure. As shown in FIG. 1, the encryption recommendation method includes steps 101-103.

Step 101 may include scanning user operations on applications, obtaining a frequency of usage of each application. The user operations may be performed by a user, where the user may be a person or a thing.

According to the embodiment of the disclosure, the terminal may scan the operations on the applications performed by the user, and update the frequencies of usage of the applications to obtain the updated frequencies of usage of the applications. For example, after the terminal boots, the user may trigger the terminal to run management software (such as mobile management software). The terminal may scan, by running the management software, the operation on the application in the terminal performed by the user, and accordingly, the frequency of usage of the application may be updated, the terminal may obtain the updated frequency of usage of the application. According to the embodiment of the disclosure, the terminal may further obtain, by running the management software, a preferred period of time (for example, in the morning, in the afternoon, in the evening, etc.) over which the application is operated by the user; the acquisition of the preferred period of time is not limited according to the embodiment of the disclosure.

Step 102 may include obtaining a set of frequently-used applications from the applications based on the frequency of usage of the each application.

According to the embodiment of the disclosure, the terminal may obtain the set of frequently-used applications of the terminal based on the frequencies of usage of the applications in the terminal For example, the terminal may select the applications having the frequencies of usage greater than or equal to a preset frequency threshold based on the frequencies of usage of all the applications in the terminal, and accordingly the set of frequently-used applications of the terminal are formed.

Step 103 may include determining at least one recommended application from the set of frequently-used applications, based on privacy weights of the set of frequently-used applications; where the at least one recommended application is to be encrypted.

According to the embodiment of the disclosure, the terminal may determine, based on the privacy weights of the set of frequently-used applications, the at least one recommended application from the set of frequently-used applications; where the at least one recommended application is to be encrypted. For example, the terminal may sort the privacy weights of the set of frequently-used applications in a descending order (e.g., the privacy weight of a communication application is greater than that of a SNS application, the privacy weight of the SNS application is greater than that of a camera application). And then the terminal may select a number of applications starting from an application which has the greatest privacy weight in the descending order of the privacy weights of the applications, as the recommended applications to be encrypted.

According to an embodiment, in the case that some applications have the same privacy weight, the terminal may sort the frequencies of usage of those applications in a descending order, and select a number of applications starting from an application which has the greatest frequency of usage in the descending order of the frequencies of usage, as the recommended applications to be encrypted.

In the method described with FIG. 1, in the case that the user operations on the applications in the terminal are scanned, the frequencies of usage of the applications may be obtained, the set of frequently-used applications are obtained based on the frequencies of usage of the applications, and the recommended application from the set of frequently-used applications may be further determined based on the privacy weights of the set of frequently-used applications. Accordingly, with the method described in FIG. 1, the encryptable private application may be automatically recommended to the user when the user operates the application in the terminal; therefore, the encryptable private application may be rapidly and effectively recommended to the user.

Figure 2:
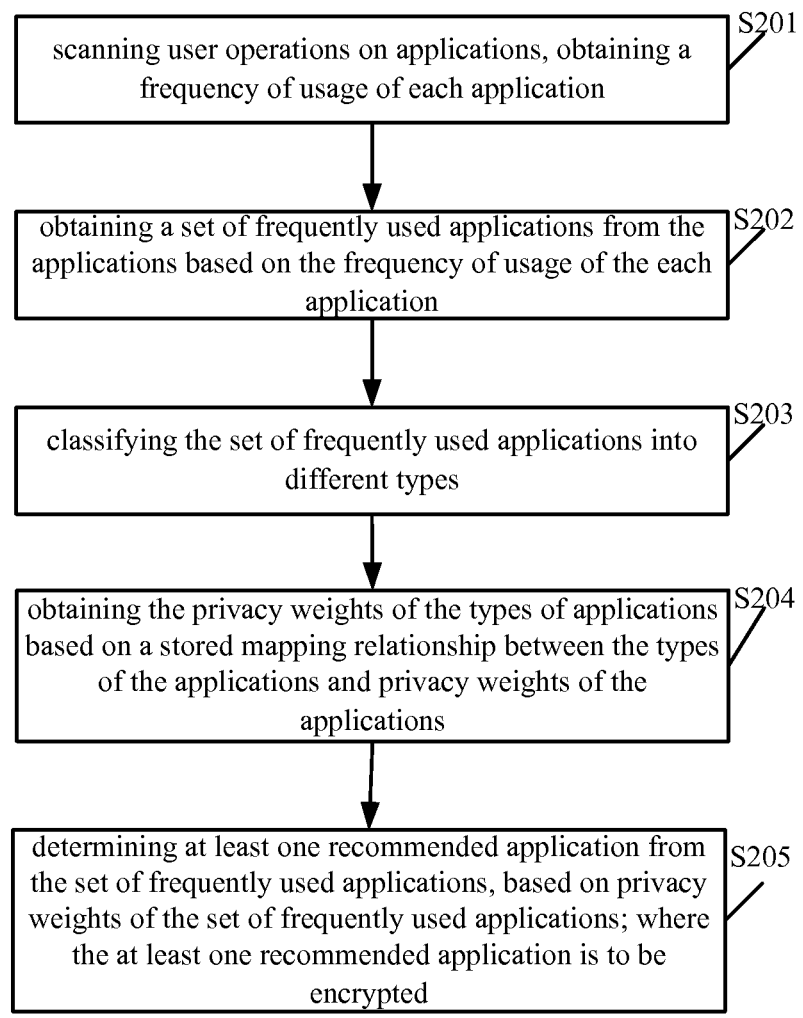
FIG. 2 is an example flow chart of an encryption recommendation method according to embodiments of the disclosure.

FIG. 2 illustrates a flow chart of an encryption recommendation method according to embodiments of the disclosure. Here the encryption recommendation method may be applied in terminals such as Smart Phones (e.g., Android phones, iOS phones, etc.), Tablet Personal Computers, Personal Digital Assistants, Mobile Internet Devices, Personal Computers, etc., which is not limited according to the embodiment of the disclosure. As shown in FIG. 2, the encryption recommendation method includes steps 201-205.

Step 201 may include scanning user operations on applications, obtaining a frequency of usage of each application.

According to the embodiment of the disclosure, the terminal may scan the operations on the applications performed by the user, and update the frequency of usage of the applications to obtain the updated frequencies of usage of the applications. For example, after the terminal boots, the user may trigger the terminal to run management software (such as mobile management software). The terminal may scan, by running the management software, the operation on the application in the terminal performed by the user, and accordingly, the frequency of usage of the application may be updated, the terminal may obtain the updated frequency of usage of the application. According to the embodiment of the disclosure, the terminal may further acquire, by running the management software, a preferred period of time (for example, in the morning, in the afternoon, in the evening, etc.) over which the application is operated by the user; the acquisition of the preferred period of time is not limited according to the embodiment of the disclosure.

Step 202 may include obtaining a set of frequently-used applications from the applications based on the frequency of usage of the each application.

According to the embodiment of the disclosure, the terminal may obtain the set of frequently-used applications from the applications based on the frequencies of usage of the applications in the terminal For example, the terminal may select the applications having the frequencies of usage greater than or equal to a preset frequency threshold based on the frequencies of usage of all the applications in the terminal, and accordingly the set of frequently-used applications of the terminal are formed.

Step 203 may include classifying the set of frequently-used applications into different types.

According to the embodiment of the disclosure, the terminal may classify the set of frequently-used applications into different types. For example, the terminal may classify the set of frequently-used applications into communication applications, SNS applications and camera applications, etc.

Step 204 may include obtaining the privacy weights of the types of applications based on a stored mapping relationship between the types of the applications and privacy weights of the applications.

According to the embodiment of the disclosure, the terminal may obtain the privacy weights of the types of applications based on a stored mapping relationship between the types of the applications and privacy weights of the applications. The types of applications have different privacy weights, for example, the privacy weight of the communication application is greater than that of the SNS application, and the privacy weight of the SNS application is greater than that of the camera application.

Step 205 may include determining at least one recommended application from the set of frequently-used applications, based on privacy weights of the set of frequently-used applications; where the at least one recommended application is to be encrypted.

According to the embodiment of the disclosure, the terminal may determine the recommended application from the set of frequently-used applications, based on the privacy weights of the set of frequently-used applications; where the recommended application is to be encrypted. For example, the terminal may sort the privacy weights of the set of frequently-used applications in a descending order (e.g., the privacy weight of the communication application is greater than that of the SNS application, the privacy weight of the SNS application is greater than that of the camera application), select a number of applications starting from an application which has the greatest privacy weight in the descending order of the privacy weights of the applications, as the recommended applications to be encrypted.

According to an embodiment, in the case that some applications have the same privacy weight, the terminal may sort the frequencies of usage of those applications in a descending order, and select a number of applications starting from an application which has the greatest frequency of usage in the descending order of the frequencies of usage, as the recommended applications to be encrypted.

In the method described with FIG. 2, in the case that the user operations on the applications in the terminal are scanned, the frequencies of usage of the applications may be obtained, the set of frequently-used applications are obtained based on the frequencies of usage of the applications, and the recommended application from the set of frequently-used applications may be further determined based on the privacy weights of the set of frequently-used applications. Accordingly, with the method described in FIG. 2, encryptable private applications may be automatically recommended to the user when the user operates the applications in the terminal; therefore, the encryptable private applications may be rapidly and effectively recommended to the user.

Figure 3:
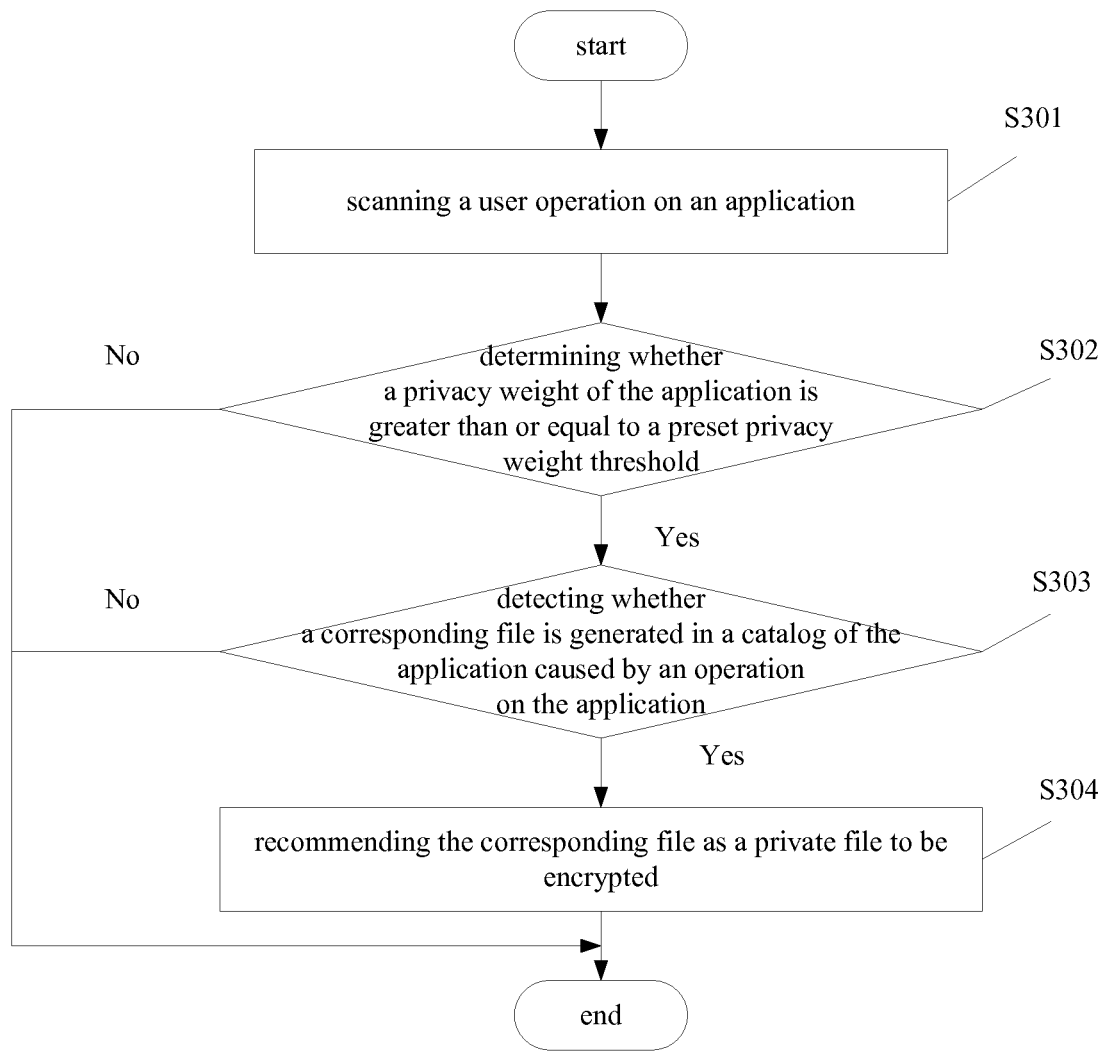
FIG. 3 is an example flow chart of an encryption recommendation method according to embodiments of the disclosure.

FIG. 3 illustrates a flow chart of an encryption recommendation method according to embodiments of the disclosure. Here the encryption recommendation method may be applied in terminals such as Smart Phones (e.g., Android phones, iOS phones, etc.), Tablet Personal Computers, Personal Digital Assistants, Mobile Internet Devices, Personal Computers, etc., which is not limited according to the embodiment of the disclosure. As shown in FIG. 3, the encryption recommendation method includes steps 301-304.

Step 301 may include scanning a user operation on an application.

According to the embodiment of the disclosure, the terminal may scan the operation on the application performed by the user. For example, after the terminal boots, the user may trigger the terminal to run management software (such as mobile management software). The terminal may scan, by running the management software, the operations on the application performed by the user. According to the embodiment of the disclosure, the terminal may further acquire, by running the management software, a preferred period of time (for example, in the morning, in the afternoon, in the evening, etc.) over which the application is operated by the user; the acquisition of the preferred period of time is not limited according to the embodiment of the disclosure.

Step 302 may include determining whether a privacy weight of the application is greater than or equal to a preset privacy weight threshold; if the privacy weight of the application is greater than or equal to the preset privacy weight threshold, proceeding to the step 303; or if the privacy weight of the application is smaller than the preset privacy weight threshold, ending the flow.

Step 303 may include detecting whether a corresponding file is generated in a catalog of the application caused by an operation on the application if the privacy weight of the application is greater than or equal to the preset privacy weight threshold; if the corresponding file is generated, proceeding to the step 304; if no corresponding file is generated, ending the flow.

Step 304 may include recommending the corresponding file as a private file to be encrypted if the corresponding file is generated in the catalog of the application caused by the operations on the application.

In the method described with FIG. 3, in the case that the operation on the application in the terminal by a user is scanned, it may be determined whether the privacy weight of the application is greater than or equal to a preset privacy weight threshold; if the privacy weight of the application is greater than or equal to the preset privacy weight threshold, it is detected whether a corresponding file is generated in the catalog of the application caused by the operation on the application; if the corresponding file is generated, the corresponding file is recommended as the private file to be encrypted. Accordingly, with the method described in FIG. 3, encryptable private files may be automatically recommended to the user when the user operates the applications in the terminal; therefore, the encryptable private files may be rapidly and effectively recommended to the user.

Figure 4:
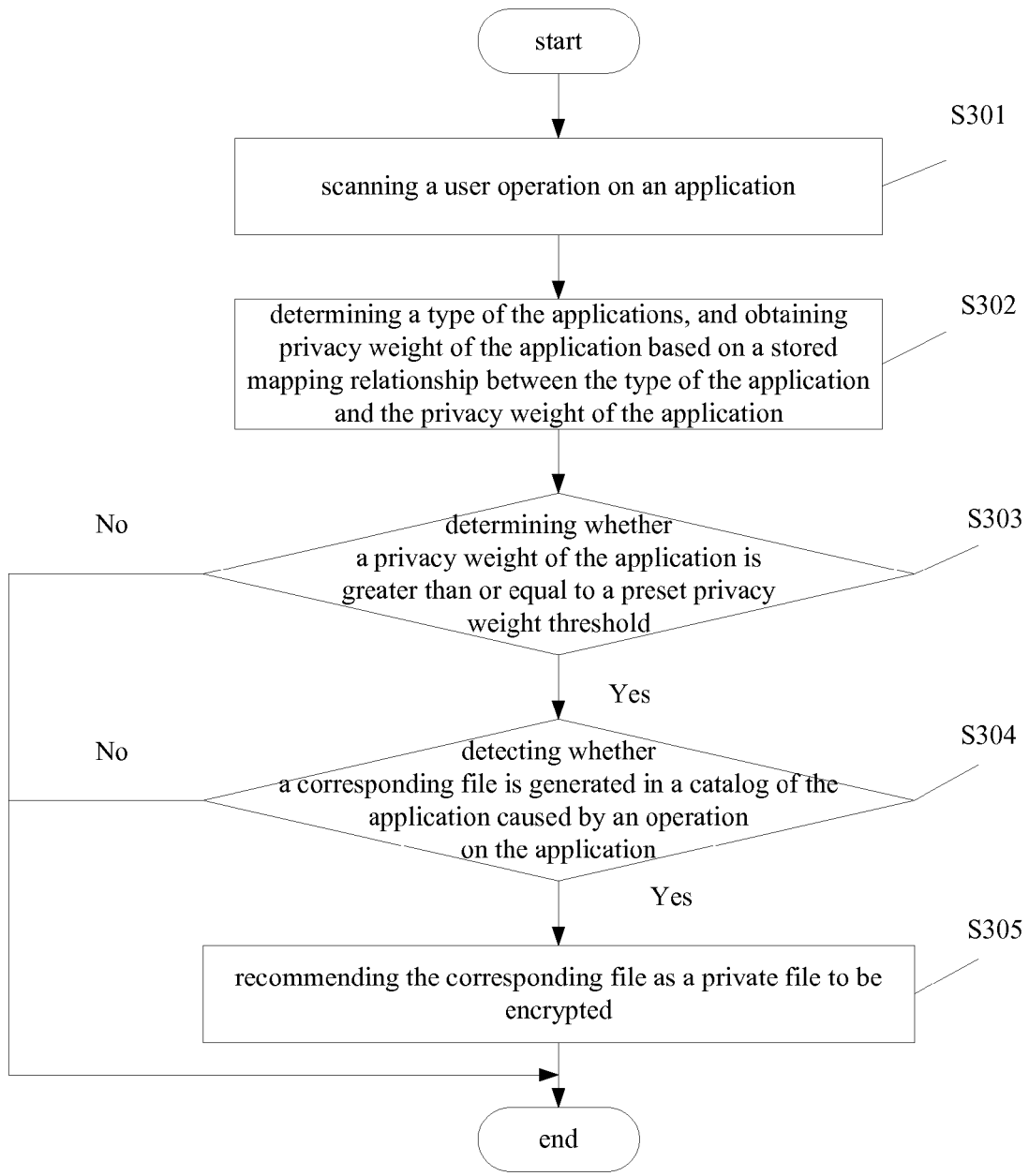
FIG. 4 is an example flow chart of an encryption recommendation method according to embodiments of the disclosure.

FIG. 4 illustrates a flow chart of an encryption recommendation method according to embodiments of the disclosure. Here the encryption recommendation method may be applied in terminals such as Smart Phones (e.g., Android phones, iOS phones, etc.), Tablet Personal Computers, Personal Digital Assistants, Mobile Internet Devices, Personal Computers, etc., which is not limited according to the embodiment of the disclosure. As shown in FIG. 4, the encryption recommendation method includes steps 401-405.

Step 401 may include scanning a user operation on an application in a terminal

According to the embodiment of the disclosure, the terminal may scan the operation on the applications performed by the user. For example, after the terminal boots, the user may trigger the terminal to run management software (such as mobile management software). The terminal may scan, by running the management software, the operations on the applications in the terminal performed by the user. According to the embodiment of the disclosure, the terminal may further acquire, by running the management software, preferred periods of time (for example, in the morning, in the afternoon, in the evening, etc.) over which the applications are operated by the user; the acquisition of the preferred periods of time is not limited according to the embodiment of the disclosure.

Step 402 may include determining a type of the application, and obtaining privacy weight of the application based on a stored mapping relationship between the type of the application and the privacy weight of the application.

According to the embodiment of the disclosure, the applications in the terminal may be classified into different types. For example, the applications may be classified into communication applications, SNS applications or camera applications, the types of the applications are not limited according to the embodiment of the disclosure. Different types of applications have different privacy weights, for example, the privacy weight of the communication application is greater than that of the SNS application, and the privacy weight of the SNS application is greater than that of the camera application. It is determined that the type of the scanned application, and the privacy weight of the application may be obtained based on the mapping relationship between the type of the application and the privacy weight of the application.

Step 403 may include determining whether the privacy weight of the applications is greater than or equal to a preset privacy weight threshold; if the privacy weight of the application is greater than or equal to the preset privacy weight threshold, proceeding to the step 303; or if the privacy weight of the application is smaller than the preset privacy weight threshold, ending the flow.

Step 404 may include detecting whether a corresponding file is generated in a catalog of the application caused by an operation on the application if the privacy weight of the application is greater than or equal to the preset privacy weight threshold; if the corresponding file is generated, proceeding to the step 304; if no corresponding file is generated, ending the flow.

Step 405 may include recommending the corresponding file as a private file to be encrypted if the corresponding file is generated in the catalog of the application caused by the operation on the application.

In the method described with FIG. 4, in the case that the a user operation on an application in the terminal is scanned, it may be determined that the type of the application, and the privacy weight of the application is obtained based on the mapping relationship between the type of the application and the privacy weight of the application; it may be determined whether the privacy weight of the application is greater than or equal to a preset privacy weight threshold; if the privacy weight of the application is greater than or equal to the preset privacy weight threshold, it is detected whether a corresponding file is generated in the catalog of the application caused by the operations on the application; if the corresponding file is generated, the corresponding file is recommended as the private file to be encrypted. Accordingly, with the method illustrated in FIG. 4, encryptable private files may be automatically recommended to the user when the user operates the applications in the terminal; therefore, the encryptable private files may be rapidly and effectively recommended to the user.

Figure 5:
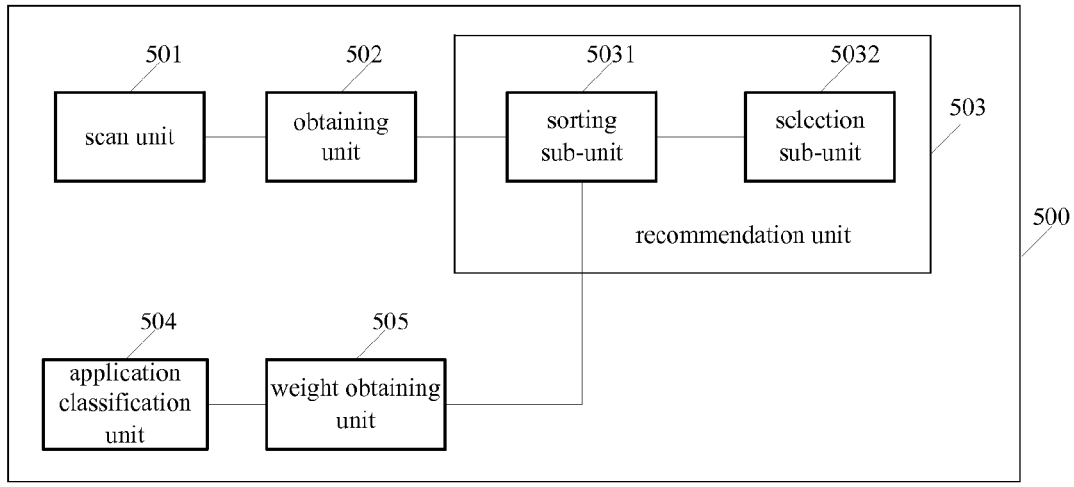
FIG. 5 is an example structure diagram of an encryption recommendation device according to embodiments of the disclosure.

FIG. 5 illustrates a structure diagram of an encryption recommendation device according to embodiments of the disclosure. Here the encryption recommendation device may be applied in terminals such as Smart Phones (e.g., Android phones, iOS phones, etc.), Tablet Personal Computers, Personal Digital Assistants, Mobile Internet Devices, Personal Computers, etc., which is not limited according to the embodiment of the disclosure. As shown in FIG. 5, the device for recommending encryption 500 may include a scan unit 501, an obtaining unit 502 and a recommendation unit 503.

The scan unit 501 is programmed to scan operations on applications in a terminal, and obtain a frequency of usage of each application.

The scan unit 501 may scan, by running management software, the operations on the applications in the terminal performed by the user, and further update the frequency of usage of the application to obtain the updated frequencies of the applications. According to the embodiment of the disclosure, the scan unit 501 may further obtain, by running the management software, a preferred period of time (for example, in the morning, in the afternoon, in the evening, etc.) over which the application is operated by the user; the acquisition of the preferred period of time is not limited according to the embodiment of the disclosure.

The obtaining unit 502 is programmed to obtain a set of frequently-used applications from the applications based on the frequency of usage of the each application.

For example, the terminal may select the applications having the frequencies of usage greater than or equal to a preset frequency threshold based on the frequencies of usage of all the applications in the terminal, and accordingly the set of frequently-used applications of the terminal are formed.

The recommendation unit 503 is programmed to determine at least one recommended application from the set of frequently-used applications, based on privacy weights of the set of frequently-used applications; where the recommended application is to be encrypted.

According to an embodiment of the disclosure, the device shown in FIG. 5 further includes:
   an application classification unit 504, programmed to classify the set of frequently-used applications into different types; and
   a weight obtaining unit 505, programmed to obtain privacy weights of the types of the applications, based on a stored mapping relationship between the types of the applications and the privacy weights of the applications.

According to an embodiment of the disclosure, the recommendation unit 503 may include:
   a sorting sub-unit 5031, programmed to sort the privacy weights of the set of frequently-used applications in a descending order; and
   a selection sub-unit 5032, programmed to select a number of applications starting from an application which has the greatest privacy weight in the descending order of the privacy weights of the applications, as the recommended applications to be encrypted.

In the device illustrated in FIG. 5, encryptable private applications may be automatically recommended to the user when the user operates the applications in the terminal; therefore, the encryptable private applications may be rapidly and effectively recommended to the user.

Figure 6:
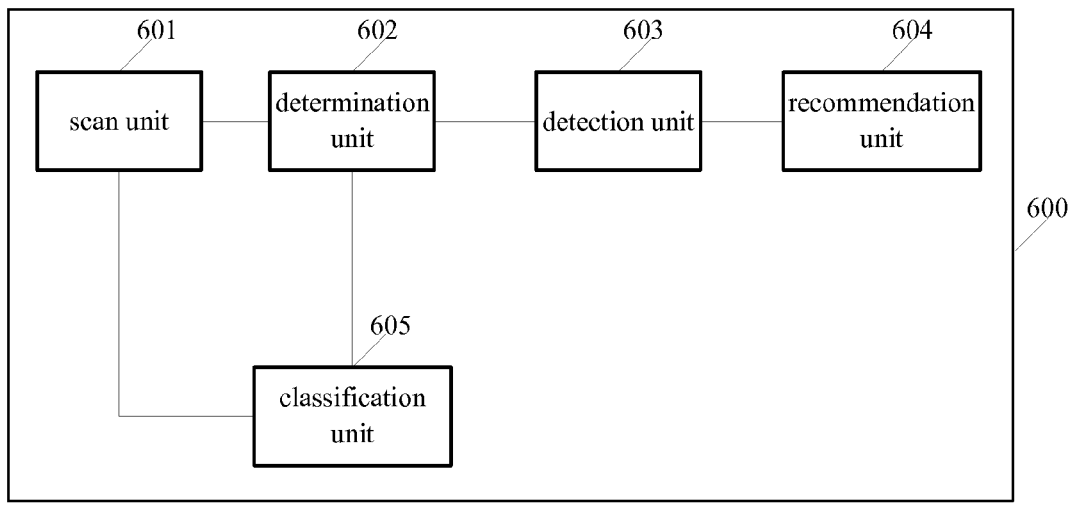
FIG. 6 is an example structure diagram of another encryption recommendation device according to embodiments of the disclosure.

FIG. 6 illustrates a structure diagram of another encryption recommendation device according to embodiments of the disclosure. Here the encryption recommendation device may be applied in terminals such as Smart Phones (e.g., Android phones, iOS phones, etc.), Tablet Personal Computers, Personal Digital Assistants, Mobile Internet Devices, Personal Computers, etc., which is not limited according to the embodiment of the disclosure. As shown in FIG. 6, the encryption recommendation device 600 may include:
   a scan unit 601, programmed to scan a user operation on an application in a terminal;
   a determination unit 602, programmed to determine whether a privacy weight of the application is greater than or equal to a preset privacy weight threshold;
   a detection unit 603, programmed to, detect whether a corresponding file is generated in a catalog of the application caused by the operation on the application, if the determination unit 602 determines that the privacy weight of the application is greater than or equal to the preset privacy weight threshold; and
   a recommendation unit 604, programmed to recommend the corresponding file as a private file to be encrypted, if the detection unit 603 detects that the corresponding file is generated in the catalog of the application caused by the operations on the application.

According to an embodiment, the device shown in FIG. 6 may further include:
   a classification unit 605, programmed to determine a type of the application scanned by the scan unit 601, and obtain the privacy weight of the type of the application based on a stored mapping relationship between the type of the application and the privacy weight of the application.

Correspondingly, the determination unit 602 may determine whether the privacy weight of the application is greater than or equal to the preset privacy weight threshold; where the privacy weight of the application is obtained by the classification unit 605.

In the device described in FIG. 6, encryptable private files may be automatically recommended to the user when the user operates an application in the terminal; therefore, the encryptable private files may be rapidly and effectively recommended to the user.

A terminal is further provided according to an embodiment of the disclosure. The disclosure may include the encryption recommendation device illustrated in FIG. 5. The terminal may automatically recommend encryptable private applications to a user when the user operates applications, and accordingly, the encryptable private applications may be rapidly and effectively recommended to the user.

Another terminal is further provided according to an embodiment of the disclosure.

The disclosure may include the encryption recommendation device for illustrated in FIG. 6. The terminal may automatically recommend encryptable private files to a user when the user operates an application, and accordingly, the encryptable private files may be rapidly and effectively recommended to the user.

It should be understood by those skilled in the art that, part of or all the steps according to the embodiments may be performed through a corresponding hardware processor instructed with a program, where the program may be stored in a computer readable storage medium accessible to the hardware processor, and the computer readable storage medium may include: flash disk, Read-Only Memory (ROM), Random Access Memory (RAM), magnetic disk, Compact Disk, etc.

The method and device for recommending encryption and the terminal disclosed according to the embodiments of the disclosure are described in detail. In the specification, the embodiments are applied to explain the principle and execution approaches of the disclosure, the embodiments are merely intended to help in understanding the method and core spirit of the disclosure; at the same time, changes on the embodiments and the application scope may be obtained by those skilled in the art based on the spirit of the disclosure, and accordingly, the specification is not intended to limit the disclosure.

What is claimed is:

1. A method for recommending encryption, comprising:
   scanning user operations on applications in a terminal, and obtaining a frequency of usage of each application;
   obtaining, by the terminal, a set of frequently-used applications from the applications based on the frequency of usage of the each application; and
   determining, by the terminal, at least one recommended application to be encrypted from the set of frequently-used applications, based on a privacy weight and the frequency of usage of each application in the set of frequently-used applications.

2. The method according to claim 1, wherein obtaining a set of frequently-used applications from the applications based on the frequency of usage of the each application comprises:
   selecting applications having frequencies of usage greater than or equal to a preset frequency threshold based on the frequencies of usage of the applications to form the set of frequently-used applications.

3. The method according to claim 2, wherein before the determining at least one recommended application to be encrypted from the set of frequently-used applications, based on a privacy weight and the frequency of usage of each application, the method further comprises:
   classifying the set of frequently-used applications into different types; and obtaining privacy weights of the types of applications, based on a stored mapping relationship between the types of the applications and the privacy weights of the applications.

4. The method according to claim 1, wherein the determining at least one recommended application to be encrypted from the set of frequently-used applications, based on a privacy weights and the frequency of usage of each application, comprises:
sorting the privacy weights of the set of frequently-used applications in a descending order;
selecting a number of applications starting from an application that has a greatest privacy weight in the descending order of the privacy weights of the set of frequently-used applications, as the recommended applications;
sorting the frequencies of usage of the applications selected in a descending order; and
selecting a number of applications starting from an application that has a greatest frequency of usage in the descending order of the frequency of usage of the applications selected.

5. A device for recommending encryption, comprising a processor and a non-transitory storage medium configured to store units comprising:
a scan unit, programmed to scan user operations on applications in a terminal, and obtain a frequency of usage of each application;
an obtaining unit, programmed to obtain a set of frequently-used applications from the applications based on the frequency of usage of the each application; and
a recommendation unit, programmed to determine at least one recommended application from the set of frequently-used applications, based on a privacy weight and the frequency of usage of each application, wherein the at least one recommended application is to be encrypted.

6. The device according to claim 5, wherein the obtaining unit is programmed to select applications having frequencies of usage greater than or equal to a preset frequency threshold based on the frequencies of usage of the applications to form the set of frequently-used applications.

7. The device according to claim 6, further comprising:
an application classification unit, programmed to classify the set of frequently-used applications into different types; and
a weight obtaining unit, programmed to obtain privacy weights of the types of the applications, based on a stored mapping relationship between the types of the applications and privacy weights.

8. The device according to claim 5, wherein the recommendation unit comprises:
a sorting sub-unit, programmed to sort the privacy weights of the set of frequently-used applications in a descending order;
a selection sub-unit, programmed to select a number of applications starting from an application which has a greatest privacy weight in the descending order of the privacy weights of the set of frequently-used applications, as the recommended applications to be encrypted;
the sorting sub-unit, programmed to sort the frequencies of usage of the applications selected in a descending order; and
the selection sub-unit, programmed to select a number of applications starting from an application that has a greatest frequency of usage in the descending order of the frequency of usage of the applications selected.

* * * * *

UNITED STATES PATENT AND TRADEMARK OFFICE
CERTIFICATE OF CORRECTION

PATENT NO. : 9,613,216 B2
APPLICATION NO. : 14/495557
DATED : April 4, 2017
INVENTOR(S) : Danhua Li et al.

Page 1 of 1

It is certified that error appears in the above-identified patent and that said Letters Patent is hereby corrected as shown below:

On the Title Page

Left column, item (30), "Foreign Application Priority Data", replace "2013 0220236" with --2013 10220236.1--.

Signed and Sealed this
Twenty-ninth Day of May, 2018

Andrei Iancu
*Director of the United States Patent and Trademark Office*